July 20, 1965  J. KOU  3,195,956

DUMPING MECHANISM FOR VEHICLES

Filed Nov. 14, 1963  2 Sheets-Sheet 1

INVENTOR
Jean Kou
BY Alexander Dowell
ATTORNEYS

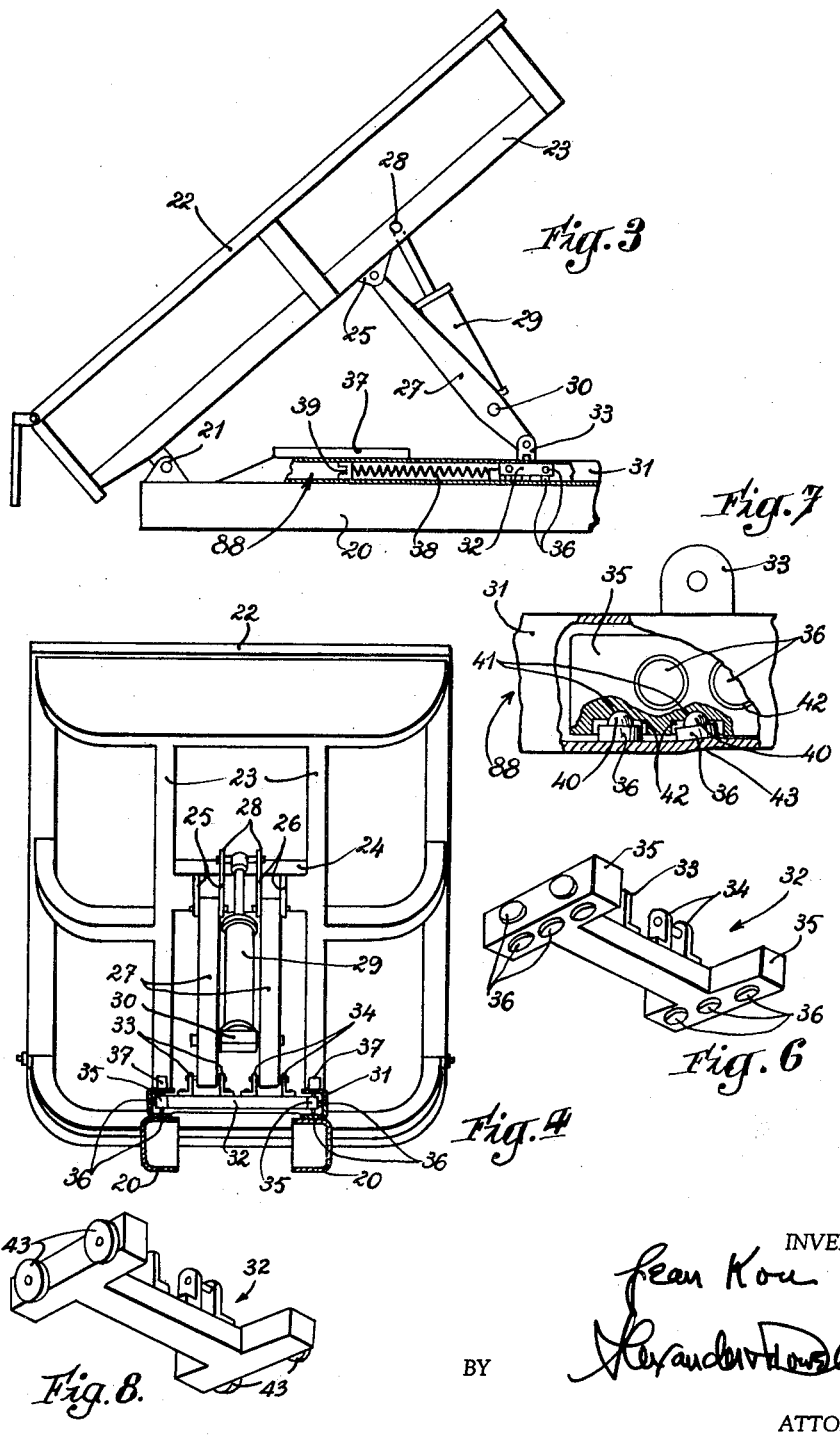

United States Patent Office 3,195,956
Patented July 20, 1965

3,195,956
DUMPING MECHANISM FOR VEHICLES
Jean Kou, Paris, France, assignor to "Bennes Marrel,"
Saint-Etienne (Loire), France, a French joint-stock
company
Filed Nov. 14, 1963, Ser. No. 323,664
Claims priority, application France, Nov. 23, 1962,
916,434, Patent 1, 347,894; Oct. 14, 1963, 950,463
4 Claims. (Cl. 298—22)

One object of this invention is to provide a dumping mechanism for actuating a dumping body or the like pivotally mounted on the chassis frame of a vehicle such as a truck.

Another object of the invention is to provide an independent dumping mechanism which may be disposed between the chassis frame and the body of a vehicle.

A more specific object of the invention is to provide a simple and not expensive dumping mechanism which gives an excellent distribution of the stresses in the chassis frame and in the body, thus permitting a reduction of the weight of the vehicle itself.

These objects are accomplished in a preferred embodiment of invention having in combination:

At least one connecting arm, one end of which is pivotally mounted at a point of a dumping body structure;

A substantially horizontal slideway rigidly secured to the chassis frame of the vehicle at the other end of each connecting arm for guiding the movements of the latter;

At least one jack extending between two articulation points, respectively situated on the connecting arm and on the body structure.

According to another characteristic of the invention, the connecting arm of the dumping mechanism comprises two parallel connecting rods onto and between which is pivotally mounted the actuating jack.

According to a still further characteristic of the invention, the slideway comprises two parallel elements having guiding profiles directed towards each other, while the corresponding end of the connecting arm engages on a shoe member fitting inside of, and sliding longitudinally within, the hollow portions of the said slideway.

A preferred embodiment of the invention has been chosen for purposes of illustration and description and is shown in the accompanying drawings, forming a part of the specification.

FIG. 4 is a front view thereof.

FIG. 5 is a side view of the said embodiment with the dumping body in a load-carrying position.

FIG. 6 is a perspective view of the shoe member longitudinally sliding within the slideway and pivotally carrying the lower end of the connecting arm.

FIG. 7 shows a detail of an alternative embodiment of the shoe-member.

FIG. 8 corresponds to FIG. 6, and shows an alternative embodiment of the shoe member.

Figure 1:
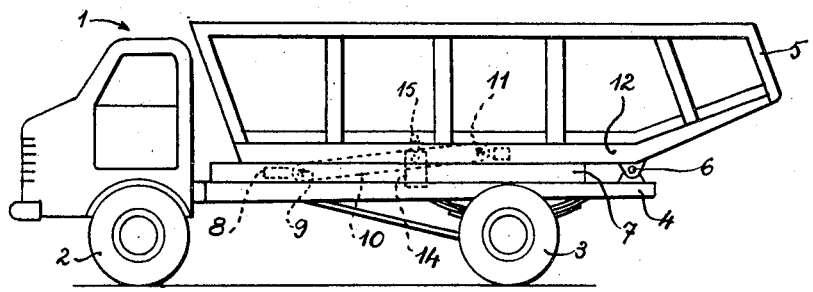
FIGS. 1 and 2 are side views of a vehicle having a dumping body respectively in a load-carrying and in tipped position.
Figure 2:
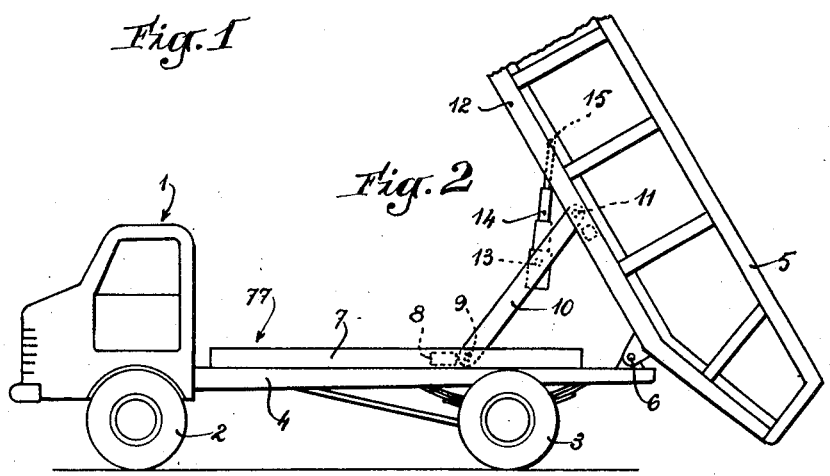

The invention is shown in FIGS. 1 and 2 in connection with a motor vehicle having front wheels 2, rear wheels 3, and a carrying chassis frame 4. The latter preferably comprises two longitudinal beams and it pivotally carries a dumping body 5 pivoted to the rear end thereof at 6. A U-iron 7 is rigidly secured on each longitudinal beam of the chassis frame 4. These two parallel sectional bars or irons 7 have their openings directed towards each other and they form a slideway 77. A shoe member 8 fits inside of, and slides longitudinally within, the hollow portions of the slideway 77. The shoe member 8 pivotally carries at 9 one end of a connecting arm 10 having its other end pivotally attached at 11 to a structure 12 rigidly secured to the lower face of the dumping body 5. The connecting arm 10 comprises two parallel connecting rods carrying between them a transverse axle 13 on which is pivotally mounted the lower end of a jack 14 having telescopic elements. The upper end of jack 14 is pivotally attached to the lower structure 12 of the dumping body 5 at 15.

Figure 3:
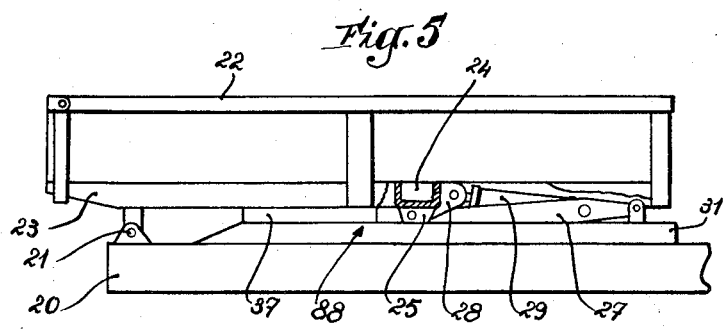
FIG. 3 is a side view of another alternative embodiment of the invention showing the dumping body in a rearwardly tipped position.

Another alternative construction is illustrated in FIGS. 3, 4, 5. Only so much of the vehicle is shown as to illustrate the disposition of the tipping mechanism, namely the rear portion of a chassis frame 20, the rear end of which pivotally carries at 21 a dumping body 22. The lower face of the latter is reinforced by two parallel longitudinal beams 23 to which is rigidly secured a transversal girder 24. Articulation brackets 25 and 26 are fixed to the latter in order to pivotally carry the upper ends of a double connecting arm 27. The transversal girder 24 is also provided with a third articulation bracket 28 onto which hinges the upper end of a jack 29 having its lowerd en fastened to a pivot unit 30. The latter is transversely disposed between the two structural connecting rods of the double-arm 27 and pivotally carried by them.

Each of the two parallel longitudinal beams of the chassis frame 20 carries a metallic bar 31 of U-shaped cross-section. The concavities of the bars 31 are directed towards each other, thus materializing a guiding slideway 88 for a I-shaped sliding shoe-member 32. The transversal portion of the latter carries two articulation brackets 33 and 34 where are pivotally mounted the corresponding ends of the double-arm 27. The transversal end-portions 35 of the I-shaped shoe-member 32 are in the form of parallelepipedic elements on three sides of which are disposed antifriction plugs 36 realized in a material of the class of the superpolyamides. Each transversal end-portion 35 of the shoe-member 32 engages in a sectional bar 31 of the slideway 88 where it may freely slide by the intermediate of the plugs 36 coming into contact with the corresponding internal faces of the sectional bar 31.

The operation is as follows:

Referring to the embodiment illustrated in FIGS. 1 and 2 and to the alternative construction shown in FIGS. 3 to 6, the initial position of the movable elements corresponds to FIGS. 1 and 5. In this transport of load-carrying position, the body 5 or 22 preferably rests on the slideway 77 or 88, either directly or with interposition of shims 37. The jack 14 or 29 is actuated by conventional and not represented means i.e. by the intermediate of a compressed fluid. When the jack 14 or 29 is extended, the body 5 or 22 tips around its rear articulation 6 or 21 and the double-arm 10 or 27 simultaneously pivots about its end articulation brackets 11 or 25–26, thus causing the shoe-member 8 or 32 to be slidably translated within the slideway 77 or 88 towards the said rear articulation 6 or 21 of the body 5 or 22.

FIGS. 2 and 3 illustrate the position of the different movable elements of the mechanism when the body 5 or 22 is in a tipped position. If releasing the fluid pressure within the cylinder of the jack 14 or 29, the dumping mechanism and the body 5 come down again by gravity into their initial positions. In practice, it is preferred to dispose a double-acting jack 14 or 29, thus permitting to positively control the upwards and downwards dumping operation of the body.

More generally, it will be noticed that the jack 14 or 29 is permanently disposed between the dumping body 5 or 22 and the chassis frame 4 or 20. Moreover, the jack 29 of the embodiment shown in FIGS. 3 to 5 has a substantially horizontal orientation when the corresponding body 22 rests horizontally on the chassis frame 20. As a result thereof, the dumping mechanism object of the present invention may be easily inserted between the body and the chassis of a pre-existing vehicle, without modifying the general structure of the said vehicle.

In practice, and this corresponds to an elementary study of the mechanism kinematics, the object of the invention provides an excellent distribution, and thus a local reduction, of the stresses exerted on the structural elements of the whole unit, i.e. on the mechanism itself, the dumping and the chassis frame. As a result thereof, it is possible to reduce the weight of the body and mechanism, and to decrease the consequential manufacturing price.

Referring now to the embodiment illustrated in FIGS. 3 to 5, a portion of the reactions of the body 22 is transferred to the front part of the carrying chassis frame 20. This transferred load may reach one half of the total load. This is an important advantage with respect to the corresponding mechanisms of known type, wherein the stress distribution is very poor.

As a constructive possibility, it has been represented in FIG. 3 a longitudinal spring 38 disposed within each of the sectional bars 31 of the slideway 88. Each spring 38 rests at one end on a fixed thrust member 39 and it permanently urges the shoe-member 32. The springs 38 are compressed by the shoe-member 32 during the upward tipping operation of the dumping body 22, and they release the accumulated energy at the beginning of the downward tipping movement of the body 22, thus making considerably easier the starting of the said movement. With such a disposition, it is possible to use a single-acting jack 29. Besides, the springs 38 operate as shock absorbers in the last discharge period, when heavy blocks come away and fall out of the body 22. Quite obviously, the springs 38 may be both replaced by a single spring resting on the transversal portion connecting the end portions 35 of the shoe-member 32. It is also possible to provide mechanisms according to the invention with any other energy accumulating system of known type.

FIG. 7 illustrates an alternative embodiment of the shoe-member 32 and more particularly of its end-portions 35, wherein cylindrical antifriction plugs 36 are pivotally connected to the said end-portions 35. The internal face of each antifriction plug 36 is slidably carried by a hemispherical bearing element 40 inserted between the said plug 36 and a spherical recess 41 in the corresponding end-portion 35. The plug 36 is thus freely movable in an adequate hole 42 of the said end-portion 35, by translation with respect to the bearing element 40 and by rotation if pivoting with the latter. This pivotal connection of each antifriction plug 36 to the shoe-member 32 makes the latter very smooth to operate, even if the bearing faces of the sectional bars 31 have geometric defects, as illustrated in FIG. 7. In this case, the orientation of each plug 36 is automatically adapted to the corresponding local bearing surface of the bars 31.

The preceding examples of embodiments according to the invention have been given only for purposes of illustration and description, but it will be understood that constructive details might be realized in a different fashion.

For example, with heavy loads, it is possible to provide the dumping mechanism with two parallel double-arms 10 or 27, each of them having an actuating jack 14 or 29.

In another embodiment, the shoe-member 32 may be provided with any known rolling means such as balls or rollers 43, in place of antifriction sliding plugs 36.

I claim:

1. In combination with a vehicle having a dumping body hinged to a pivot spindle on the vehicle, a body dumping mechanism comprising a pair of longitudinal beams rigidly secured to the vehicle chassis, a shoe-member sliding on each of the said longitudinal beams, at least one lift rod articulated at one end on the said dumping body and at the other end on at least one of the said shoe-members, and at least one extensible jack pivotally attached at one end to said lift rod and at the opposite end to said dumping body.

2. In a combination as claimed in claim 1, said dumping mechanism comprising two chassis longitudinal beams disposed parallel and made of profiled bars having opposite hollow portions, and wherein is slidably mounted the shoe-member hinged to the lift-rod.

3. In a combination as claimed in claim 1, said dumping mechanism comprising two chassis longitudinal beams disposed parallel and made of profiled bars having opposite hollow portions, and wherein is slidably mounted the shoe-member provided with rollers guided by the said longitudinal beams.

4. In a combination as claimed in claim 1, said dumping mechanism comprising two chassis longitudinal beams disposed parallel and made of profiled bars having opposite hollow portions, and wherein is slidably mounted the shoe-member provided with antifriction means.

References Cited by the Examiner
UNITED STATES PATENTS
2,525,899  10/50  Gustafson _____ 298—22

BENJAMIN HERSH, *Primary Examiner.*

R. DAVID BLAKESLEE, ARTHUR L. LA POINT,
*Examiners.*